Oct. 30, 1923.
W. C. STOCKLIN
1,472,144
AUTOMATIC FISHING LINE REEL
Filed March 26, 1923
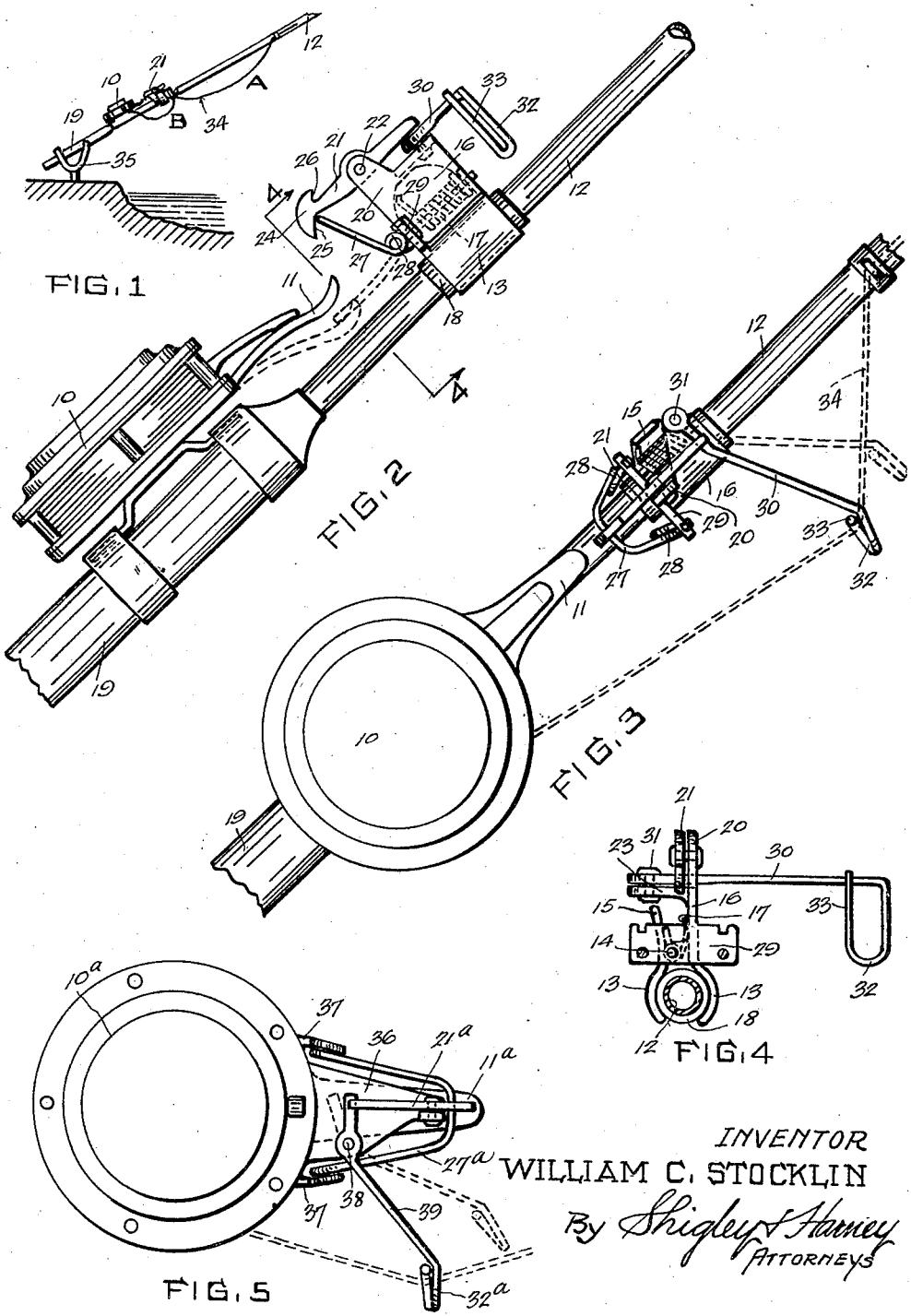
INVENTOR
WILLIAM C. STOCKLIN
By Shigley & Harney
Attorneys Patented Oct. 30, 1923.

1,472,144

UNITED STATES PATENT OFFICE.

WILLIAM C. STOCKLIN, OF COLUMBUS, OHIO, ASSIGNOR OF ONE-HALF TO EMMETT E. RUH, OF COLUMBUS, OHIO.

AUTOMATIC FISHING-LINE REEL.

Application filed March 26, 1923. Serial No. 627,877.

*To all whom it may concern:*

Be it known that I, WILLIAM C. STOCKLIN, a citizen of the United States of America, residing at Columbus, in the county of Franklin and State of Ohio, have invented certain new and useful Improvements in Automatic Fishing-Line Reels, of which the following is a specification.

My present invention relates generally to devices for use in connection with fishing lines for rendering active commonly known and used automatic reels, my object being the provision of a simple inexpensive arrangement which may be utilized either in connection with the reel itself or as an attachment for a fishing rod, in either instance adapting the rod to be anchored and left for the proper operation of the automatic reel when a fish is hooked.

It is a well known fact that automatic reels are ordinarily set with a brake in active position so that the line can be pulled out only with considerable difficulty, the brake being released by a lever which is normally in inactive position and is ordinarily moved to active position to release the brake by the operator so that with the brake released the reel is free to operate under its spring tension and not only carries and reels the line but lets the line out under perfect control, permitting no slack in the line no matter how the fish leaps, plunges, runs in or swims out. In the ordinary operation, an operator is of course necessary and my invention purposes an arrangement through the use of which the operator may be dispensed with and provision made for the automatic shifting of the brake release lever from its normal inactive position to its active position when a fish is hooked, thus permitting a rod to be anchored and the attention of the operator to other things.

In the accompanying drawing which illustrates my present invention and forms a part of this specification, Figure 1 is a side view of a portion of an anchored fishing rod equipped with an automatic reel and provided with my invention in the form of an attachment to the rod and reel, Figure 2 is an enlarged side view of the reel carrying portion of a rod equipped with my improvements as in Figure 1, Figure 3 is a top plan view of the parts shown in Figure 2, Figure 4 is a cross section taken on line 4—4 of Figure 2, showing my attachment in rear elevation, with the lever actuating spring broken away, and Figure 5 is a top plan view illustrating a slightly modified form in which my improvements are mounted in connection with the reel itself.

Referring now to these figures my invention proposes means in connection with an automatic reel generally indicated at 10 in the several figures, whereby the brake release lever 11 thereof may be depressed or shifted toward the rod 12 on which the reel is mounted in order that said brake release lever may be mechanically moved from its normal inactive position wherein the brake controlled thereby is active to prevent automatic operation of the reel, to an active position wherein the brake is released, or in other words from the normal inactive position shown in full lines in Figure 2 to the active position shown in dotted lines in said figure.

The means whereby this operation may be accomplished are preferably in the form of an attachment adapted to be situated upon the rod 12 adjacent to the reel 10 and forwardly thereof, as shown in Figures 1 to 4 inclusive, the attachment including a pair of rod clasping jaws 13 hingedly connected to one another as at 14 and formed in connection with a pair of plates 15 and 16 of which the plate 15 is in the nature of a finger piece shiftable toward and away from the plate 16 to open or close the jaws 13, plates 15 and 16 having a spring 17 therebetween by means of which they are normally spaced apart and the jaws tensioned for movement toward one another.

In applying the device to a fishing rod 12, the latter is preferably provided in the first instance with a bushing 18 telescoped thereon and snugly surrounding the same adjacent to its handle 19 and forwardly of the reel 10, which bushing is preferably formed by a section of rubber tubing so that the jaws 13 can effectively engage the sides of the rod in efficiently supporting relation without marring or scratching the rod itself.

The side plate 16 upstands above the side plate 15 and is provided at its rear portion with an upstanding ear 20 to which a trigger 20 is pivotally connected as at 22 in the ends thereof, the forward end of which trigger overlies and is vertically shiftable above a laterally extending supporting ear 23 at the forward portion of the upper edge of plate 16.

The rear end of trigger 21 has a head 24 provided with a lower shouldered portion 25 and an upper hook portion 26, the former being normally engaged with the central portion of a U-shaped lever actuating spring 27 whose extensions have tension coils 28 and are connected at their extremities to the apertured and notched outer ends of a cross plate 29 projecting across the rear edges of the plates 15 and 16 and preferably secured in any suitable manner to the rear edge of plate 16. The normal position of the actuating spring 27 is shown in Figure 2 wherein it will be seen that by virtue of its engagement in the upper inactive position shown in full lines, by the shouldered lower portion 25 of the trigger head, it can only be released by downward movement of the forward end of trigger 21 and such movement is normally resisted by the inner portion of a trip arm 30, pivotally mounted as at 31 upon the laterally projecting supporting ear 23 so that in its normal laterally outstanding position, this trip arm extends beneath the forward end of trigger 21 and must be shifted forwardly on its pivot 31 in order to permit the trigger to rock vertically and release the actuating member or spring 27 for movement downwardly upon the brake release lever 11.

The trip arm 30 forms a line guide and for this purpose has an outer vertically elongated line guide loop 32 whose upstanding terminal portion 33 is spaced from the outer portion of the trip arm in order that the fish line 34 may be readily extended into the guide loop 32.

As seen in Figure 1 where the handle end 19 of the rod 12 is secured in connection with an anchor 35, the fish line 34 is preferably attached to the line guide 32 of the trip arm in such manner that a loop A is left forwardly of the attachment and a loop B is left between the attachment and the reel 10, and also in such a manner that an outward pull upon the fish line will carry the trip arm with it while an inward pull will release the fish line in order that the automatic reel 10 may thereafter function as usual.

Thus when a fish takes the bait and hook it may travel with the same in the limit allowed by the slack of the fish line in the loop A plus the movement of the trip arm in a forward direction from beneath the forward end of the trigger. Immediately this movement of the parts takes place however the forward end of the trigger is free to swing downwardly and the rear end upwardly to release the brake lever actuating member or spring 27 whereby the latter swings downwardly and forcibly depresses the brake releasing lever 11 in order to thus place the reel 10 in effectively operating position. Under tension of its spring, the reel thereupon promptly starts to wind the fish line thereon and in doing so takes up the slack within the loop B, thus giving the reel ample opportunity to get under headway in order that the loose connection of the line with the guide loop 32 of the trip arm will be pulled free with a jerk that is communicated along the line to the hooked fish and much resembles the usual jerk applied by hand in order to effectively set the hook into the fish. Thereafter the automatic reel 10 will operate as usual and it is to be noted that it is a simple matter to form in the fish line what is known as a "halter hitch", which is engaged with the terminal upright 33 of the line guide of the trip arm, which hitch is unimpaired when the line is moved forwardly or outwardly, and is pulled free when the line is shifted inwardly during the operation of the reel 10.

It will be observed that my invention thus provides for a simple inexpensive attachment of the nature described for carrying out the objects of the invention and by reference to Figure 5 it will be seen that instead of being in the form of an attachment applicable to the rod 12 outwardly beyond or in advance of the rear, may be provided in connection with and as a part of the reel itself as for instance by providing the reel $10^a$ of an outstanding support 36 overlying its brake release lever $11^a$, upon which support 36 the trigger $21^a$, similar in all respects to the trigger 21, may be pivoted intermediate its ends, its forward head end engaging the brake lever depressing member or spring $27^a$, whose extensions 37 are secured to the reel $10^a$. The outstanding support 36 also provides a fulcrum 38 for the laterally swinging trip arm line guide 39, whose inner end normally extends beneath the rear or inner end of the trigger $21^a$ and whose outer end has a guide loop $32^a$ similar to the beforementioned guide loop 32. Thus the same functions are carried out when the trip arm 39 is shifted forwardly, its inner portion being moved rearwardly from beneath the inner or rear end of the trigger so that the latter is free to shift vertically at its head end in order to relase the lever actuating member $27^a$.

When the atachment is not in use, the lever actuating member or spring 27 may be secured in an upper inactive position out of the path of movement of the brake releasing lever, by engaging this actuating member or spring with the upper hook portion 26 of the trigger head 24.

I claim:

1. The combination with an automatic fishing line reel having means normally holding the same inactive, and mechanical line-actuated means for relasing said holding means when the line is pulled away from the reel including a reel engaging member, a trigger normally holding said engaging member in inactive position, and a line-actuated trip member normally controlling said trigger.

2. The combination with an automatic reel for fish lines having a normally inactive brake releasing lever, of a member movable into engagement with said lever for shifting the latter to active position, a trigger normally controlling said movable member, and a line-actuated trip normally holding the trigger against effective movement.

3. The combination with an automatic reel for fish lines having a normally inactive brake relasing lever, of a member movable into engagement with said lever for shifting the latter to active position, a trigger normally controlling said movable member, and a line-actuated trip normally holding the trigger against effective movement, and a support for said lever shifting member, said trigger and said trip, having means for engaging and detachably supporting the same upon a fishing rod.

4. The combination with an automatic reel for fish lines having a normally inactive brake releasing lever, of a member movable into engagement with said lever for shifting the latter to active position, a trigger normally controlling said movable member, and a line-actuated trip normally holding the trigger against effective movement, and a support for said lever shifting member, said trigger and said trip, having spring-actuated rod engaging jaws for the purpose described.

5. A device of the character described including a U-shaped vertically shiftable actuating member, a vertically swingable trigger engageable at one end with said member to normally hold the same in inactive position, and a trip arm normally engaging the opposite end of said trigger to prevent effective movement thereof, said trip arm laterally outstanding and horizontally shiftable and having an outer line guide.

6. A device of the character described including a U-shaped vertically shiftable actuating member, a vertically swingable trigger engageable at one end with said member to normally hold the same in inactive position, and a trip arm normally engaging the opposite end of said trigger to prevent effective movement thereof, said trip arm laterally outstanding and horizontally shiftable and having an outer line guide, and a support for said parts including a pair of supporting plates upon one of which said parts are mounted, having a pivotal connection and controlling spring and having depending gripping jaws for the purpose described.

In testimony whereof I have affixed my signature.

WILLIAM C. STOCKLIN.